July 2, 1935. H. R. JOHNSON 2,006,504
REFLECTOR BELT
Filed Dec 15, 1934 2 Sheets-Sheet 1

Inventor
H. R. Johnson
By Clarence A. O'Brien
Attorney

July 2, 1935. H. R. JOHNSON 2,006,504
REFLECTOR BELT
Filed Dec. 15, 1934 2 Sheets-Sheet 2
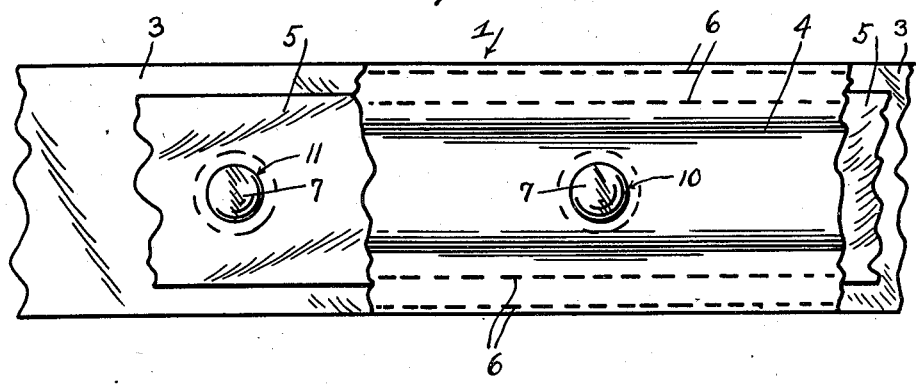
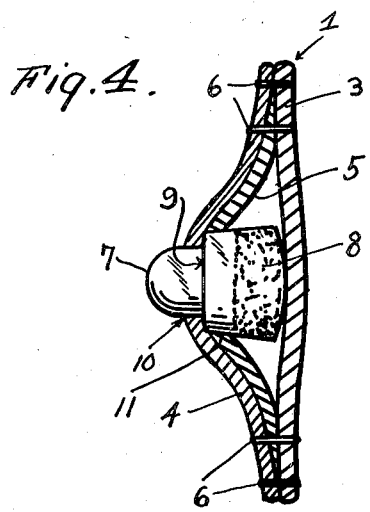
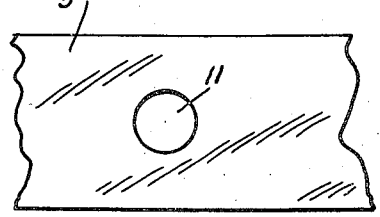
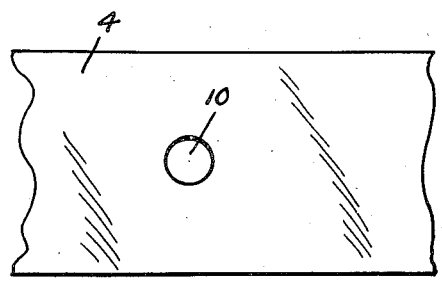
Inventor
H. R. Johnson
By Clarence A. O'Brien
Attorney Patented July 2, 1935

2,006,504

UNITED STATES PATENT OFFICE 2,006,504

REFLECTOR BELT

Harry R. Johnson, Baltimore, Ohio.

Application December 15, 1934, Serial No. 757,702

4 Claims. (Cl. 88—80)

The present invention relates to new and useful improvements in reflector belts for use particularly by pedestrians when walking on public highways at night and has for its primary object to provide, in a manner as hereinafter set forth, a device embodying a novel construction and arrangement which, by reflecting the light from an approaching vehicle, will render the individual wearing the device easily discernible to the driver of said vehicle.

Another very important object of the invention is to provide a belt adapted to be worn about the body or arm of a person, said belt having a plurality of reflector buttons mounted therein and further including novel means for securing said buttons in position.

Other objects of the invention are to provide a reflector belt which may be expeditiously secured in position, which will be comparatively simple in construction, strong, durable, compact, light in weight, attractive in appearance and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 3 is a fragmentary view with portions broken away to show the several straps comprising the belt.

Figure 4 is a sectional view, taken substantially on the line 4—4 of Figure 2.

Figure 5 is a fragmentary view in plan, showing a portion of the intermediate strap.

Figure 6 is a fragmentary view in plan, showing a portion of the outer strap.

Figure 1:
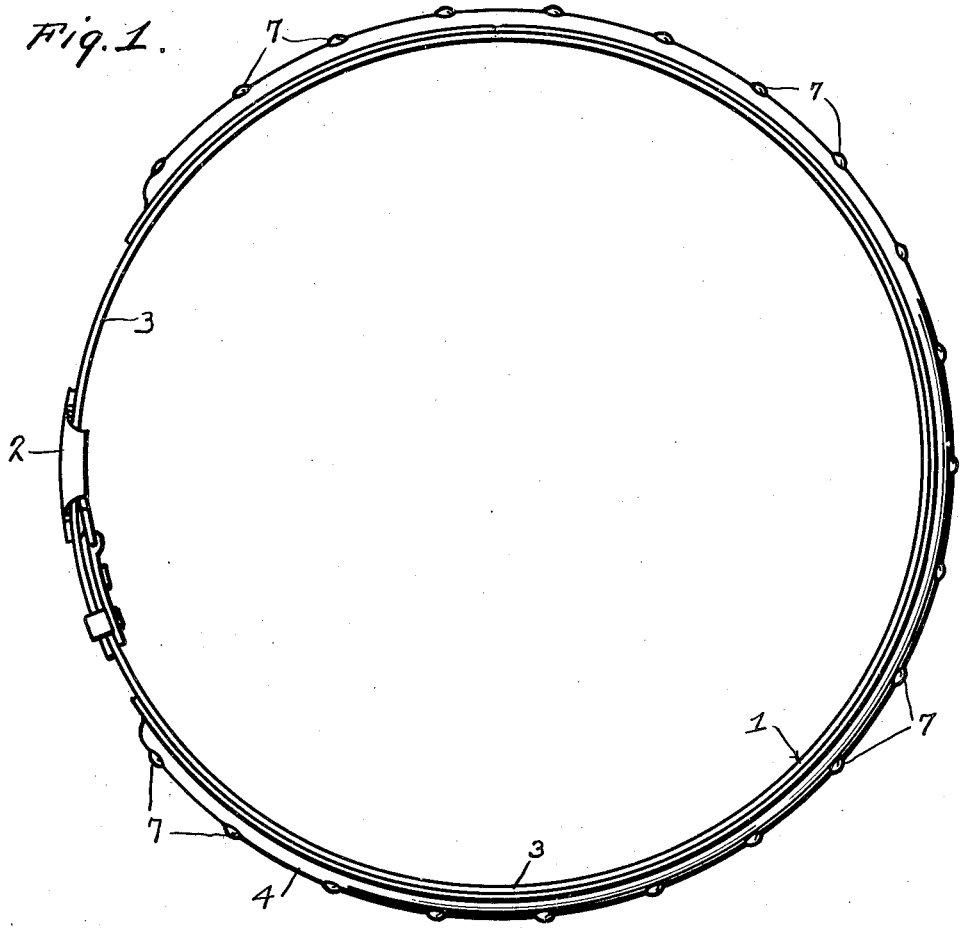
Figure 1 is a view in side elevation of a reflector belt constructed in accordance with the present invention.
Figure 2:
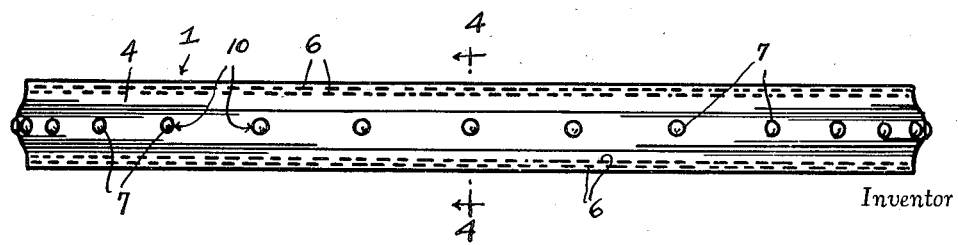
Figure 2 is a plan view thereof.

Referring now to the drawings in detail, it will be seen that the embodiment of the invention which has been illustrated comprises a belt which is designated generally by the reference numeral 1, said belt being formed from any suitable flexible material, preferably leather. The belt 1 may be of any suitable size or length to encircle the body or limbs of a person. At its ends, the belt 1 is adapted to be adjustably and detachably connected by a suitable buckle 2.

As illustrated to advantage in Figure 4 of the drawings, the belt 1 comprises an inner strap 3, an outer strap 4, and an intermediate strap 5. The straps 3, 4 and 5 which the belt 1 comprises are secured together adjacent their longitudinal edges in any appropriate manner, as by stitches 6. It will be noted that the edges of the intermediate strap 5 are feathered and spaced inwardly from the edges of the inner and outer straps 3 and 4, respectively, thus concealing said intermediate strap.

Mounted at spaced points in the belt 1 are reflector buttons 7 which include comparatively large base portions 8 which bear against the inner strap 3, said enlarged portions 8 providing shoulders 9 on said buttons. The outer strap 4 has formed therein comparatively small openings 10 through which the comparatively small outer portions of the buttons 7 project. It will thus be seen that the shoulders 9 engage the inner face of the outer strap 4 and in this manner said buttons are retained in the belt 1.

The intermediate strap 5 has formed therein comparatively large openings 11 which are aligned with the openings 10 and into which the base portions 8 of the reflector buttons 7 extend. This, also, is shown to advantage in Figure 4 of the drawings. The intermediate strap 5 assists materially in maintaining the reflector buttons 7 in position in the belt 1 preventing lateral movement of said buttons.

It is believed that the manner of using the device will be readily apparent. The belt 1 is mounted in position, preferably around the body or an arm, adjustment being permitted by the buckle 2 as hereinbefore stated. Then, when a vehicle approaches the lights thereof are reflected by the buttons 7 in the belt 1 thus attracting the attention of the operator of said vehicle.

It is believed that the many advantages of a reflector belt constructed in accordance with the present invention will be readily understood, and although a preferred embodiment of the invention is as illustrated and described, it is to be understood that changes in the details of construction and in the combination and arrangement of parts may be resorted to which will fall within the scope of the invention as claimed.

What is claimed is:—

1. A safety device of the class described comprising a belt, said belt including an inner strap and an outer strap, said straps being secured together, the outer strap having spaced openings therein, reflector buttons mounted between the inner and outer straps, said reflector buttons including reduced end portions projecting through the openings and further including shoulders engaged with the outer strap, and means for securing the ends of the belt together.

2. A safety device of the class described comprising a belt, said belt including inner, outer and intermediate straps secured together the outer strap having spaced openings therein, the intermediate strap having comparatively large openings therein aligned with the first-named openings, reflector buttons mounted in the belt, said reflector buttons including enlarged base portions engaged in the second-named openings and further including shoulders engaged with the inner face of the outer strap, said reflector buttons projecting through the first-named openings, and means for connecting the ends of the belt together.

3. A safety device of the class described comprising a flexible belt, said belt including an inner strap, an outer strap, and an intermediate strap, said straps being secured together along their longitudinal marginal portions, the rest of said straps being free to each other, the outer strap having spaced openings therein, the intermediate strap having comparatively large openings therein aligned with the first-named openings, reflector buttons mounted in the belt and projecting through the first-named openings, said reflector buttons comprising enlarged base portions engaged in the second-named openings, said reflector buttons further including shoulders engaged with the outer strap, and means for adjustably and detachably connecting the ends of the belt together.

4. A safety device of the class described comprising a flexible belt adapted to encircle the body or a limb of a wearer, said belt including an inner strap, an outer strap, and an intermediate strap, said straps being secured together at their longitudinal marginal portions, the rest of said straps being free of each other, the longitudinal edges of the intermediate strap being feathered and spaced inwardly from the longitudinal edges of the inner and outer straps, the outer strap having spaced openings therein, the intermediate strap having comparatively large openings therein aligned with the first-named openings, reflector buttons mounted in the belt and projecting through the first-named openings, said reflector buttons including comparatively large base portions engaged in the second named openings and further including shoulders engaged with the inner face of the outer strap, and means for adjustably and detachably connecting the ends of the belt together.

HARRY R. JOHNSON.